Dec. 31, 1968 H. A. NELSON 3,419,855

COINCIDENT CURRENT WIRED CORE MEMORY FOR COMPUTERS

Filed Dec. 24, 1964

Sheet 1 of 2

INVENTOR.
Hayden A. Nelson
BY
Hugh L. Fisher
ATTORNEY

COINCIDENT CURRENT WIRED CORE MEMORY FOR COMPUTERS

Filed Dec. 24, 1964 Sheet 2 of 2

INVENTOR.
Hayden A. Nelson

BY Hugh L. Fisher
ATTORNEY

United States Patent Office 3,419,855
Patented Dec. 31, 1968

3,419,855

COINCIDENT CURRENT WIRED CORE MEMORY FOR COMPUTERS

Hayden A. Nelson, Santa Barbara, Calif., assignor to General Motors Corporation, Detroit, Mich., a corporation of Delaware Filed Dec. 24, 1964, Ser. No. 420,960
16 Claims. (Cl. 340—174)

ABSTRACT OF THE DISCLOSURE

A fixed content toroidal core magnetic memory employing coincident current readout. A two dimensional array of cores is linked by word drive lines defining word columns. A bundle of data lines threads rows of the array, and corresponds in the number of conductors to the number of words storable in each column. Each data line represents a discrete word in each column and links in a positive sense only those cores where a "1" is to be represented.

SUMMARY OF THE INVENTION

This invention relates to information storage systems, commonly called "memories," and more particularly to a coincident current read-only memory using magnetic cores where information storage is provided in the physical configuration of the drive windings.

General purpose computers employ memories into which new information may be periodically written. Currently, however, there is an increasing need for special purpose computers having memories, or at least portions of the memories, in which the information stored is used over and over again without change. Such a memory system need have only a read capability. However, the read procedure should be nondestructive and this characteristic should be obtained without the necessity for complex information restoring apparatus. Such memories may be called nondestructive, read-only, fixed information memories. One class of read-only memory employs an array of magnetic cores as energy transfer mechanisms, while information storage is provided in the configuration of the wires associated with the core array. These memories, known as "wired core memories," are, in general, extremely reliable and compact. Reliability results from the fact that information is inserted in the memory during the construction thereof by means of the wiring configuration. In magnetic memories of this type the magnetic elements themselves no longer function as storage locations for individual bits of information but actually serve only as energy transfer devices which transform interrogation pulses on input windings into voltages on output windings, the character of these voltages being a function of the information permanently wired into the memory. Compactness results from the fact that many bits may be stored in a single magnetic core, the limit being fixed only by the number of wires which may be threaded through an individual core.

One type of wired core, fixed information memory makes use of the well-known "linear select" accessing technique. A linear select, wired core memory, where information is stored in the drive line configuration, may be provided by linking each of a number of drive lines, each representing a word of storage, through a different coded combination of a column of magnetic cores, the code representing the bits of the word stored. Parallel readout is accomplished by threading a separate sense line through each of the cores in the column. Alternatively, a linear select memory with storage in the sense lines may be constructed by threading each core in a row of cores with a separate word drive line and threading the entire row with a bundle of sense lines, the particular sense lines in the bundle which link each individual core being a coded representation of the word to be stored in that core. The linear select memory has the disadvantage of requiring a separate drive line for each word of storage. Accordingly, address selection must be accomplished entirely external to the core array and the decoding circuitry required limits severely the capacity of the memory which may be practically provided using the linear select principles.

A second type of wired core, fixed information memory is called the "core rope" memory. This memory type greatly simplifies address selection by linking 2N square loop cores in rope fashion with 2N drive lines. Data is stored in the geometry of the sense windings which selectively link the cores, each core representing a word, to define the information stored there. In operation, coincident drive currents on N drive lines overcome a set current in all cores but one. This core, whose position is selected by the combination of drive currents, is switched by a set current. A subsequent reset pulse switches the selected core back to its original state. This system has the disadvantage that extreme noise during set time requires that the data be sampled during the reset pulse. Further, in large capacity memory applications the core rope has the disadvantage of requiring large amounts of power and also exhibits a large cumulative noise effect from unswitched cores.

The present invention proposes a read-only, wired core, fixed information memory employing coincident current selection techniques with storage contained in the drive line configuration. This memory exhibits the high reliability and compactness of wired core, fixed information memories and further permits a significant increase in the capacity of the memory relative to the selection circuitry required. In addition, the advantages of the invention are not accompanied by unfavorable noise conditions, as exhibited by the core rope type memory.

In general, the memory system provided in accordance with the present invention contemplates one or more linear arrays of high remanence magnetic cores and a word drive line linking each array and energizable in accordance with coincident current selection principles to partially drive all the cores in the array toward a threshold of switching. This partial drive does not switch the cores from the original remanent flux state to an opposite flux state, but supplies part of the field required to do so. This action will be referred to as "partial switching" throughout the remainder of the specification. A bundle of data drive lines corresponding in number to the number of words storable in each linear array is threaded through the array with each of the data drive lines linking, in a common sense with regard to the output voltages, the cores in the array where a "1" is to be stored. The data drive lines are independently energizable to partially switch all of the cores linked thereby in accordance with coincident current selection principles. Through the use of the coincident current selection technique, address decoding is simplified, and the number of bits of information which may be stored in the memory is greatly increased over the linear select and core rope memory types.

Various specific readout technique may be employed in connection with the invention. In a first specific embodiment, a parallel readout of information is accomplished by linking each of the memory cores in the array with a sense line for each bit. Thus, upon coincident energization of the word drive line and one of the data drive lines, a word having as many bits as there are cores in the array will be read out in parallel fashion on the sense lines. In a second specific embodiment, serial readout can be accomplished by threading each of the cores in the array with one of a plurality of bit drive lines. The bit drive lines may be sequentially energized coincident with the word drive line and a data drive line to read out the individual bits of a word on a common sense line one bit at a time in traditional serial fashion.

In a still further embodiment of the invention, a hybrid system may be provided in which parallel readout of a number of bits at a time in a number of sequential steps may be implemented.

In each case it can be seen that the readout process effects a change in the magnetic state of all the cores which contain a "1" in the word read out. Accordingly, means are provided to restore each of the cores to the initial magnetic state which existed prior to the readout process. Since the wired core, fixed information concept permits every core in the array to reside in the same magnetic state prior to the readout operation, it can be seen that this reset step may be performed by a simple unidirectional current source feeding a single line commonly linking all of the cores in the same magnetic sense.

Various additional features of the invention, as well as several specific and preferred implementations thereof, are brought out in particular detail in the following specification. This description is to be taken with the accompanying figures of which:

FIGURE 1 is a schematic diagram of a representative portion of a coincident current parallel readout magnetic core array embodying the invention;

FIGURE 2 diagrammatically indicates the effect on the magnetic state of the cores of the various signals occurring in the various drive, reset and sense lines of the invention as shown in FIGURE 1;

Figures 1, 2, 3:
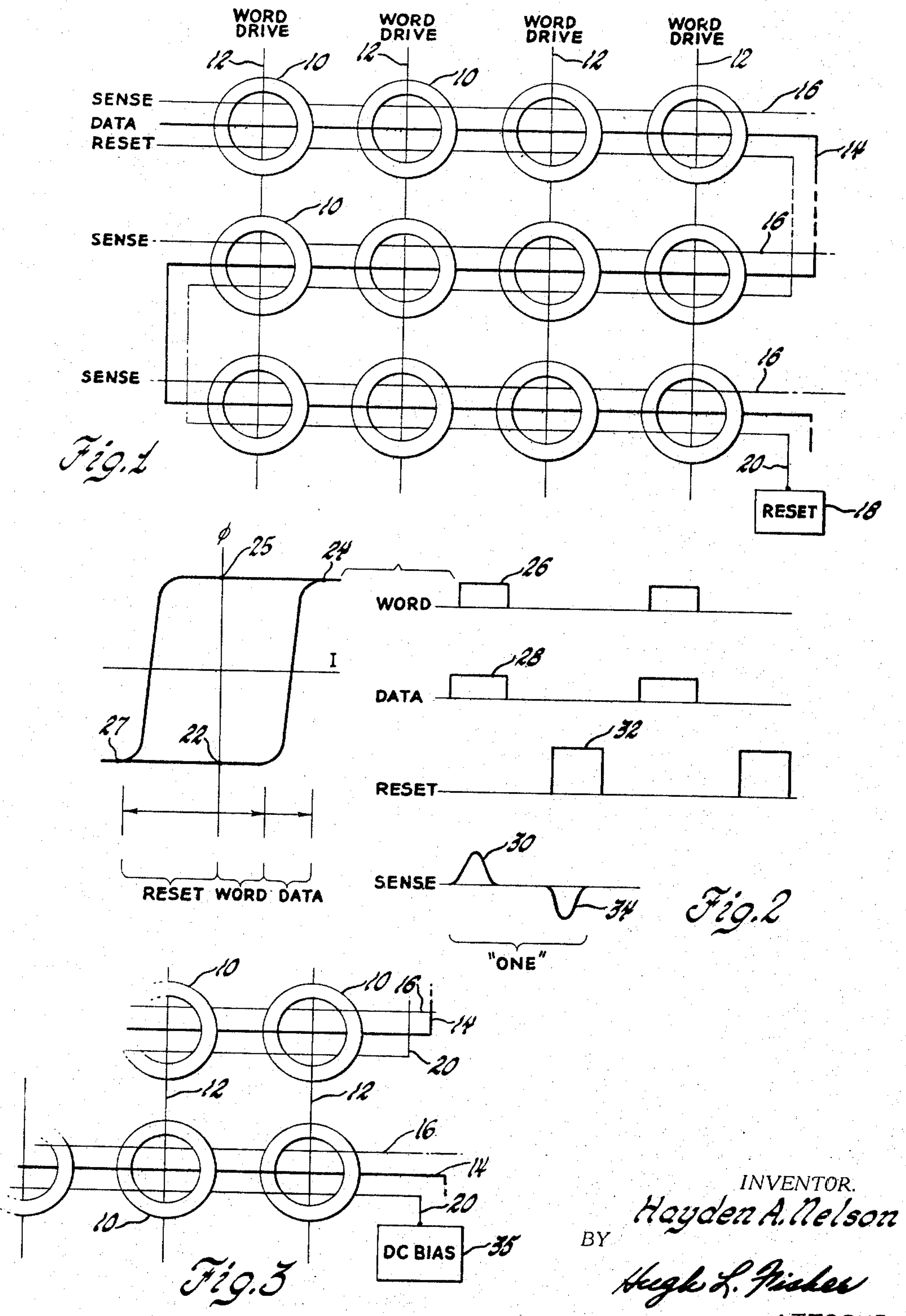
FIGURE 3 is a representative portion of the parallel coincident current system of FIGURE 1 employing an alternative reset means.

Referring specifically to FIGURE 1, there is shown a two-dimensional array of simple toroidal magnetic cores 10. This two-dimensional array may also be thought of as a number of linear arrays corresponding to the various columns of cores. Each of the cores 10 is constructed of a material such as ferrite which exhibits a substantially square hysteresis loop such that there exists two remanent flux states of opposite polarity. In the following specification, as well as in the appended claims, the arrays of cores are discussed as being planar and being divided into rows and columns of cores. It will be appreciated that this designation refers to the arrangement of drive and sense lines which link the cores and not to the actual physical interrelation of the cores. With this in mind it may be stated that the two-dimensional array of cores 10 is divided, as shown in FIGURE 1, into four columns each of which is linked by a word drive line 12. The word drive lines are separately energizable with current of such a magnitude as to drive each of the cores 10 partially toward the threshold of switching from one remanent flux state toward the other in traditional coincident current selection fashion. It will be understood that FIGURE 1 shows only a representative portion of a memory system. For example, a 4,096 word memory employing 24 bits per word may employ 64 columns of cores each having 24 cores and capable of storing 64 words. Other symmetrical and asymmetrical arrangements are equally feasible. Each horizontal row of cores is linked by a portion of a continuous bundle 14 of data drive lines. This bundle 14, as represented by the heavy line shown in FIGURE 1, represents for the 4,096 word, 24 bit per word memory a bundle of 64 drive lines each of which may be used to select 64 words in accordance with the particular word drive line also selected. Each of the data drive lines in the bundle 14 links in a common magnetic sense the cores in the array in which a "1" is to be stored. Where "0" is to be stored, the particular data drive line may merely bypass that core. However, from the standpoints of uniformity of inductive loading, DC resistance, operating margins and packaging symmetry, it has been found preferable to link the cores representing a "0" in the opposite direction as the "1" storing cores. Thus it can be seen that in the "0" storing cores, a pulse in the data drive line produces not a flux reversal but only a shuttling effect.

For example, assuming that the 4-column, 3-core per column representation shown in FIGURE 1 represents the entire memory, if the particular word corresponding to one of the data drive lines in bundle 14 is to be represented by the binary code form "111" and this word also corresponds to the first or left-handmost column of cores 10 shown in FIGURE 1, that particular data drive line would link in the same magnetic sense each of the cores in the left-handmost column. Thus, upon coincidence of currents in that data drive line and also in the word drive line 12 linking that column, the word "111" could be read out.

To perform this readout operation, each of the horizontal rows of cores 10 is threaded with a sense line 16. Thus, upon energization of a word drive line 12 and a data drive line in the bundle 14, a word consisting of as many bits as there are cores in the vertical column will be read out in the traditional parallel fashion. The number of "1's" and "0's" in the word being read out will correspond to the number of cores linked in one direction and the number of cores linked in the opposite direction, respectively, by the particular data drive line representing that word.

After the readout operation, in which "1" storing cores are switched from one remanent flux state to the other by double coincidence of currents in the lines linking the cores, it is necessary to reset the switched cores to the original position such that those cores may be subsequently selected as representing certain bits of another word. Thus, a source 18 of reset pulses is connected to a reset line 20 which links all of the cores in the two-dimensional array shown in FIGURE 1. The pulses produced by the reset source 18 are opposite in magnetic effect to that of the word drive line as regards the remanent flux state of each of the cores 10.

Describing the operation of the memory represented in FIGURE 1 in somewhat greater detail, FIGURE 2 shows a typical square hysteresis loop for the ferrite cores 10. Each of the cores 10 normally resides in the remanent flux state indicated at point 22 on the hysteresis loop. Upon selection of a word by external decoding circuitry, as is well known to those skilled in the computer art, a data drive line in the bundle 14, corresponding to the word selected, will be energized with a pulse 28. This pulse 28 is of approximately half the magnitude required to switch each of the "1" cores linked thereby from flux state 22 to state 24.

After a short time is allowed for the transient noise from the data drive pulse to die out, one of the word drive lines 12 is selected for energization by the external circuitry and receives a drive pulse 26. The word drive line pulse completes the magnetic reorientation to flux state 24 of each of the cores 10 where there is a double coincidence of current-carrying lines threading the core so as to produce a magnetic force in the same direction, i.e., at each of the cores in the word selected where "1" is to be read out. The momentary flux change in each of the switched cores is effective to produce an output pulse 30 on each of the sense lines which links a core 10 where a "1" is stored.

It should be noted at this point that each of the columns of cores 10 in FIGURE 1, and therefore each of the word drive lines 12 shown in FIGURE 1, represents not one but a plurality of words. For example, in the 4,096 word, 24 bit per word memory previously described, each of the columns may be considered as a simple linear array of cores containing as many as 64 words. It will be noted that the number of words storable in a column also corresponds to the number of data drive lines in the bundle 14. As an example, if the word "101" is to be read from the left-handmost column of cores, looking to FIGURE 1, the data drive line selected for energization is that line which links the top and bottom cores in the word column in a direction whereby the field aids that of the word drive line but links the middle core (the "0" core) in a direction whereby the field opposes that produced by the word drive line. In this arrangement, the output pulses 30 are produced on the top and bottom sense lines 16 while only shuttle noise appears on the middle sense line.

To reset the memory for the next read operation, source 18 produces a reset pulse 32 subsequent to the word and data drive pulses 26 and 28, respectively. Pulse 32 is of approximately twice the amplitude of each of the pulses 26 and 28 so as to completely return the magnetic orientation of the switched cores to the original state represented by point 22 on the hysteresis loop. Upon removal of the drive currents, the "1" storing cores relax to the upper remanent state 25. To accomplish this magnetic reorientation, the reset pulse 32 must, of course, drive the core along the hysteresis loop from point 25 to point 27 such that removal of the magnetic driving force allows the residual flux to return along the loop from 27 to point 22. The reset pulse and the corresponding flux change in the reset core produces a pulse 34 in the sense lines which is opposite in polarity to the pulse 30. Either pulse may be taken as the information signal.

Referring to FIGURE 3, a portion of the two-dimensional array, as shown in FIGURE 1 is reproduced. The mode of resetting the cores, however, is modified from that shown and described above to include a DC bias source 35 which is connected to the reset line 20. Source 35 applies a constant DC bias to each of the cores 10 in the two-dimensional array which magnetically opposes the forces produced by energization of the word and data drive lines 12 and 14 such that all of the cores normally reside in the biased state represented by point 27. By this means, considerable improvement in the operating margins may be obtained. Again, the preferred embodiment employs a data drive bundle wherein lines link "1" cores in the forward direction and "0" cores in the reverse direction. Also, as in FIGURES 1 and 2, the selection process is preferably carried out such that the data drive current is turned on slightly prior in time to the word drive line to allow noise effects to die out. As is apparent, only those cores wherein co-directional data and word drive fields are produced will be switched to provide output signals indicating "1's."

Serial readout of the contents of the two-dimensional array shown in FIGURES 1 and 3 can be accomplished using the double coincident technique previously described. This may be accomplished by breaking the data drive bundle 14 between horizontal rows and connecting the sense lines 16 in series to form a single sense line linking all of the cores in the array. The bits of the word are then sequentially or serially selected by energization of a word drive line 12 and sequential energization of a data drive line in each of the bundles 14 corresponding to the horizontal rows.

With reference to the above description of the operation of the embodiments shown in FIGURES 1 and 3, it will be noted that each of the column word drive lines 12 links alternate cores in the column in opposite direction. Similarly, the sense lines 16 link alternate cores in the rows in opposite directions. This wiring arrangements is, of course, preferred for packaging purposes to allow the greatest density and simplicity in the completed package. However, for purposes of this description and also for the definition of the invention found in the appended claims, it is to be understood that the "common sense" of the windings, as is described with reference to the sense in which the windings link the cores, refers to the overall magnetic effect or output producing effect of each of the cores and not to the actual physical sense of the windings in the cores.

Figure 4:
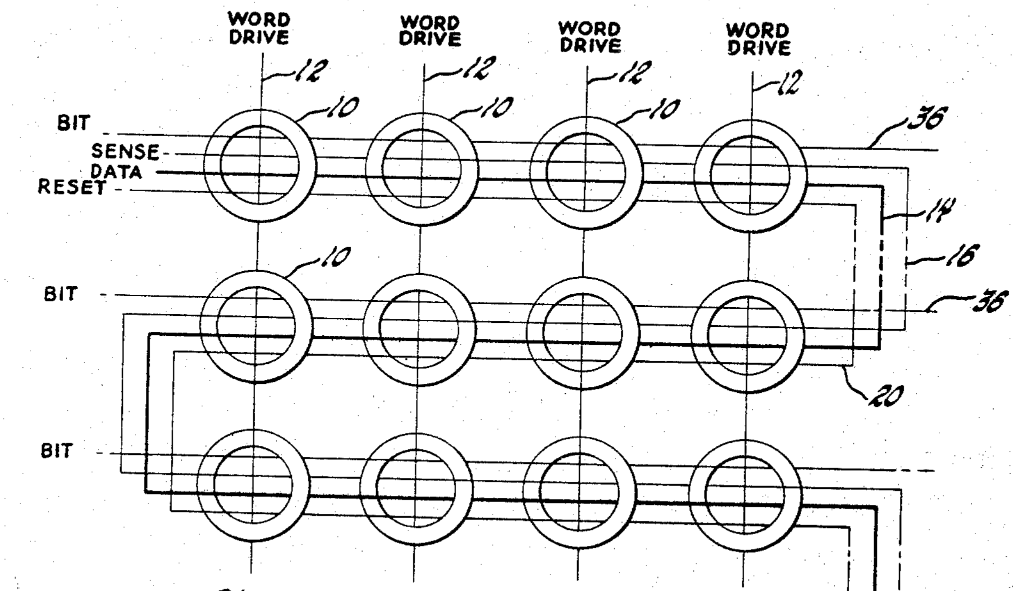
FIGURE 4 is a schematic diagram of a representative portion of a coincident current fixed information serial readout memory embodying the invention.

A further embodiment of the invention employing triple coincidence of drive currents to produce a readout in serial fashion is shown in FIGURE 4. As was described with reference to FIGURES 1 and 3, a two-dimensional array of magnetic cores 10 is provided. Each of the columns in the array is linked by a word drive line 12 which threads each of the cores in the column. A data drive line bundle 14 links the rows of cores in alternately opposite directions as also was the case in FIGURES 1 and 3. For serial readout purposes, a single sense line 16 is threaded in a common sense through all of the cores 10 in the two-dimensional array to receive output pulses in accordance with the switched cores. However, the triple coincidence serial readout embodiment shown in FIGURE 4 differs from the double coincidence parallel readout embodiment shown in FIGURE 1 by virtue of the addition of a plurality of bit drive lines 36. A bit drive line 36 is provided for each of the horizontal rows and links each of the cores in the row in a common sense.

To provide a 4,096 word, 24 bit per word memory, as was previously described with reference to FIGURE 1, 64 columns of 24 cores may be provided. The data drive line bundle 14 may consist of 64 lines, each line representing 64 words and threading in one sense those cores which represent a "1" in the word to be read and either bypassing or threading in an opposite sense those cores which represent a "0." In addition, a reset line 20 is threaded through the array so as to link all of the cores in a common sense and is connected to a DC bias source 35 as shown in FIGURE 3 to produce a constant magnetic field which, in the absense of drive currents, maintains all of the cores in a flux state corresponding to point 46 of FIGURE 5.

Consistent with the analysis of the systems shown and described with reference to FIGURES 1 and 3 the serial readout embodiment shown in FIGURE 4 may be taken to represent a group of 64 linear arrays of 24 cores each, corresponding to the 24 cores found in each of the columns of cores. Each column is capable of storing 64 words of 24 bits each. Since there are 64 columns, a total of 4,096 words of 24 bits each may be stored in and read out of the memory shown in FIGURE 4.

Figures 5, 6:
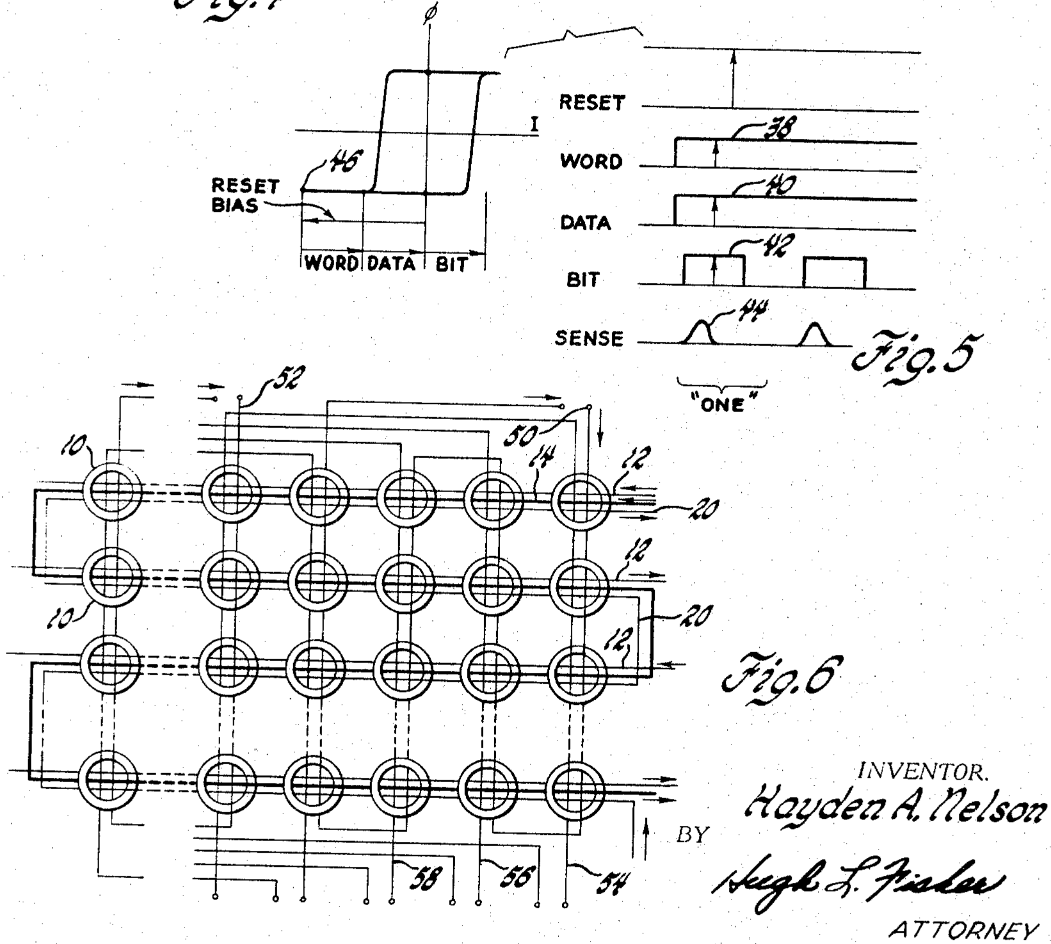
FIGURE 5 is a diagram indicating the magnetic effect of the signals appearing on the various drive, reset and sense lines of the invention as shown in FIGURE 4.
FIGURE 6 is a schematic diagram of the hybrid serial-parallel readout wired core permanent memory constructed in accordance with the present invention.

Describing the operation of the embodiment shown in FIGURE 4, reference should be had to the diagrams in FIGURE 5. There is shown in FIGURE 5 a traditional square hysteresis loop which represents the magnetic characteristics of each of the cores 10 found in the two-dimensional aray shown in FIGURE 4. The reset line 20 is connected to a DC bias source such as 35 shown in FIGURE 3 to supply a constant DC bias to each of the cores 10 to establish the initial magnetic state of each of the cores at the point 46. In a preferred operating mode, the word and data drive currents are turned on and maintained throughout the word readout process. Bit current, however, must await the decay of noise created by the rise of the data current. Accordingly, a data pulse 40 is produced in the data line corresponding to the word to be read and a word pulse 38 is produced in the word drive line 12 which corresponds with the group of words in which the selected word resides. However, no core is switched since according to the hysteresis loop diagram three units of drive current are required to completely switch the core so as to produce an output pulse on the sense line 16. This third unit of drive current is provided in the form of bit pulses 42 which occur sequentially on the row bit drive lines 36. Accordingly, external selection circuitry supplies the bit pulses 42 to the bit drive lines 36 to sequentially complete the flux reversal of each of the cores in the selected word until the entire word has been read out serially. The switching of the selected cores in the selected word produces a serial coded train of output pulses 44 on the sense lines 16 representing in coded fashion the word read out. The word and data drive pulses 38 and 40 must, of course, be maintained until the last bit pulse has occurred. At the termination of the drive pulses 38, 40 and 42, the DC bias supplied to reset line 20 is effective to return the switched cores to the original state by traveling along the upper path of the hysteresis loop shown in FIGURE 5 to return to the point of origin 46. As an alternative method of operation, the bits of the word may be read out by discrete word, data and bit pulses occuring in a timed sequence.

Referring now to FIGURE 6, a hybrid combination serial-parallel readout fixed information memory is shown. In this memory parallel readout of a number of bits at a time in a number of sequential steps is possible. This arrangement is similar to the triple coincidence serial readout shown in FIGURE 4. However, the memory is split into a number of sections operating in a parallel fashion as between sections but operating in a serial readout fashion considering any single section. As was the case in the triple coincidence serial readout embodiment, the two-dimensional array of cores 10 is divided into rows and columns. Each horizontal row is linked by a separate word drive line 12. In addition, a bundle of data drive lines 14 is provided. Each line in the bundle 14 links those cores where a "1" is to be stored in the words corresponding to that line and either bypasses or links in the opposite sense those cores where a "0" is to be presented. A reset line 20 is threaded through all of the cores in the array for reset purposes. However, the memory is divided by means of the bit drive line and sense line configurations. As shown in FIGURE 6, a first bit drive line 50 links all of the cores in the four right-handmost columns to define a first serially read out section. A second bit drive line 52 links the next four columns of cores and additional bit drive lines are provided linking the next groups of four columns in sequence throughout the remainder of the memory proceeding toward the left as shown in the drawing. A first sense line 54 linking the first column, starting from the right-hand side of the memory as shown in the figure, of each of the sections of the array is provided. A second sense line 56 links the second column of each of the sections. A third sense line 58 links the third column, and so forth throughout the memory.

In operation, the word drive line 12 and the selected line in the bundle 14 of data drive lines are simultaneously energized to set up the word in the memory to be read out. This readout is accomplished in four sequential periods with 6 bits at a time being read out assuming a 24 bit word as was previously the case. Bit line 50 is first energized to switch as many as 4 cores in the first memory section. This produces output pulses (assuming "1's" are stored) in sense lines 54, 56, 58, etc., which respectively link the first 4 columns of the first section. Bit line 52 is energized next to switch the cores in the second section and so on throughout the word.

Many variations of the specific examples of the invention which are described above in complying with the statutory requirement of disclosure will be apparent to those skilled in the art. These specific embodiments are to be construed as merely illustrative and not as limiting the invention. For a definition of the invention, reference should be had to the appended claims.

What is claimed is:

1. A fixed information coincident current magnetic memory comprising: at least one linear array of magnetic cores each having two remanent flux states, for each array present a word drive line linking each core in the array and energizable to partially switch all of the cores in the array linked thereby from one remanent state to the other, a bundle of data drive lines corresponding in number to the number of words storable in each linear array, each of the data drive lines representing a discrete word in each array and linking only the cores in the array where a bit corresponding to said other remanent state is to be stored to be energizable coincidently with a word driveline to partially switch all of the cores so linked from one remanent state to the other, and sensing means linking the cores for producing output signals whenever a core is switched from said one state to said other.

2. Apparatus as defined in claim 1, further including a bias line linking all of the cores in the same sense, and means for producing a DC bias signal in the bias line tending to oppose the switching of the cores from said one state to said other.

3. Apparatus as defined in claim 1, further including means operable after energization of said word drive and data drive lines for resetting the switched cores to said one remanent state.

4. Apparatus as defined in claim 3 wherein the resetting means comprises a single reset line linking all of the cores in a common sense, and means for producing a pulse in the reset line sufficient in amplitude to switch the cores between the stable states.

5. A fixed information coincident current magnetic memory comprising: at least one linear array of magnetic cores each having two remanent flux states, for each array present a word drive line linking each core in the array and energizable to partially switch all of the cores in the array linked thereby from one remanent state toward the other, a bundle of data drive lines corresponding in number to the number of words storable in each linear array, each of the data drive lines representing a discrete word in each array and linking only the cores in the array where a bit corresponding to said other remanent state is to be stored, the data drive lines being individually energizable coincidentally with a word drive line to partially switch all of the cores so linked from said one state to said other, and a plurality of sense lines each linking an individual core to produce an output signal when the core is switched between remanent states thereby to read out in parallel fashion the word corresponding to the data drive line selected for energization.

6. Apparatus as defined in claim 5, further including means operable after energization of said word drive and data drive lines for resetting the switched cores to said one remanent state.

7. Apparatus as defined in claim 5, further including a bias line linking all of the cores in the same sense, and means for producing a DC bias signal in the bias line tending to oppose the switching of the cores from said one state to said other.

8. Apparatus as defined in claim 1 wherein the sensing means is a single line linking all of the cores, the combination further including a plurality of bit drive lines linking individual cores in the array in the same sense and sequentially energizable to partially switch the cores linked thereby from said one remanent state to said other thereby to serially read out the bits of the word corresponding to the data drive line selected for energization.

9. A fixed information coincident current magnetic memory comprising a two-dimensional array of magnetic cores each having two remanent flux states, a plurality of word drive lines, each word drive line linking each core in a separate column of cores in the array and energizable to partially switch the cores linked thereby from one remanent state to the other, a bundle of data drive lines corresponding in number to the number of words storable in each column of the array, each of the data drive lines linking, in a common sense, only the cores in the array where a bit corresponding to said other remanent state is to be stored to be energizable coincidentally with a word drive line to partially switch all of the cores linked thereby toward said other remanent state, and sensing means linking the cores for producing output signals according to the number of cores switched from said one state to said other.

10. Apparatus as defined in claim 9 further including a bias line linking all of the cores in the same sense, and means for producing a DC bias signal in the bias line tending to oppose the switching of the cores from said one state to said other.

11. Apparatus as defined in claim 9 wherein the sensing means is a single line linking all of the cores in the array in the same sense, the combination further including a plurality of bit drive lines linking respective rows of cores in the array and sequentially energizable to partially switch the cores linked thereby from said one remanent state to said other state thereby to serially read out the bits of the word corresponding to the word drive line and data drive line selected for energization.

12. Apparatus as defined in claim 9 further including means operable after energization of said word drive and data drive lines for resetting the switched cores to said one remanent state.

13. Apparatus as defined in claim 12 wherein said means comprises a single reset line linking all of the cores in a common sense, and means for producing a pulse in the reset line sufficient in amplitude to switch the cores between the stable states.

14. A fixed information coincident current magnetic memory comprising a two-dimensional array of magnetic cores each having two remanent flux states of opposite polarity, a plurality of word drive lines linking respective columns of cores in the array and energizable to partially switch the cores linked thereby from one remanent state to the other, a bundle of data drive lines corresponding in number to the number of words storable in each column of the array, each of the data drive lines linking, in a common sense, only those cores in the array where a bit corresponding to said other remanent state is to be stored to be energizable to partially switch all of the cores linked thereby toward said other remanent state, and a plurality of sense lines linking respective rows of cores in parallel to produce output signals when a core in the row is switched thereby to read out in parallel fashion the word corresponding to the combination of the word drive line and data drive line selected for energization.

15. Apparatus as defined in claim 14 further including means operable after energization of said word drive and data drive lines for resetting the switched cores to said one remanent state.

16. Apparatus as defined in claim 14 further including a bias line linking all of the cores in the same sense, and means for producing a DC bias signal in the bias line tending to oppose the switching of the cores from said one state to said other.

References Cited

UNITED STATES PATENTS

| | | | |
|---|---|---|---|
| 3,058,096 | 10/1962 | Humphrey et al. | 340—174 |
| 2,968,029 | 1/1961 | Grosser | 340—174 |
| 3,023,320 | 2/1962 | Kahn et al. | 340—174 |

BERNARD KONICK, *Primary Examiner.*

P. SPERBER, *Assistant Examiner.*